United States Patent
Ditner et al.

(10) Patent No.: US 12,441,552 B2
(45) Date of Patent: Oct. 14, 2025

(54) SYSTEM AND METHOD FOR ELECTRIC MOTOR CONTROL IN A MANUFACTURING ENVIRONMENT

(71) Applicant: ATS CORPORATION, Cambridge (CA)

(72) Inventors: John Leo Ditner, Cambridge (CA); Albert Kleinikkink, Cambridge (CA)

(73) Assignee: ATS CORPORATION, Cambridge (CA)

( * ) Notice: Subject to any disclaimer, the term of this patent is extended or adjusted under 35 U.S.C. 154(b) by 552 days.

(21) Appl. No.: 17/334,894

(22) Filed: May 31, 2021

(65) Prior Publication Data

US 2021/0284461 A1    Sep. 16, 2021

Related U.S. Application Data

(63) Continuation of application No. PCT/CA2019/051724, filed on Dec. 2, 2019.
(Continued)

(51) Int. Cl.
*B65G 43/00* (2006.01)
*B25J 9/12* (2006.01)
(Continued)

(52) U.S. Cl.
CPC ............ *B65G 43/00* (2013.01); *B65G 23/23* (2013.01); *H02P 5/68* (2013.01); *B25J 9/126* (2013.01);
(Continued)

(58) Field of Classification Search
CPC ........... B65G 43/00; B65G 23/23; H02P 5/68; H02P 25/06; H02P 8/16; B25J 9/126;
(Continued)

(56) References Cited

U.S. PATENT DOCUMENTS 3,918,574 A * 11/1975 Allison .................. B65G 23/36
                                                    318/113
4,236,604 A * 12/1980 Warner .............. G06K 7/10871
                                                    198/810.01
(Continued)

FOREIGN PATENT DOCUMENTS

EP          578366 A2 *  1/1994  ................ H02P 3/06
EP         1724915 A3    7/2015
(Continued)

OTHER PUBLICATIONS

International Search Report, World Intellectual Property Office, corresponding PCT Patent Application No. PCT/CA2019/051724, dated Mar. 5, 2020.
(Continued)

*Primary Examiner* — Bickey Dhakal
(74) *Attorney, Agent, or Firm* — Amarok IP Inc.; Neil W. Henderson

(57) ABSTRACT

A control system for an electric motor in a manufacturing environment, the control system including: a safety relay; and a power reduction circuit, wherein, when the safety relay is triggered, the power reduction circuit automatically limits the power supplied to the electric motor from a main power source such that the electric motor operates in a predetermined safe mode. A method for controlling an electric motor in a manufacturing system, the electric motor having a main power supply, the method including: monitoring the manufacturing system associated with the electric motor for a change in condition; on detecting a change in condition: limiting a power supplied to the electric motor, via a power reduction circuit, such that the electric motor operates in a predetermined safe mode. The power reduction circuit includes a reduced power supply and a means of dropping the power supplied to the electric motor quickly.

19 Claims, 9 Drawing Sheets

Related U.S. Application Data

(60) Provisional application No. 62/773,631, filed on Nov. 30, 2018.

(51) Int. Cl.
  *B25J 9/16* (2006.01)
  *B65G 23/23* (2006.01)
  *H02P 5/68* (2006.01)

(52) U.S. Cl.
  CPC ..... *B25J 9/1674* (2013.01); *B65G 2203/0291* (2013.01); *B65G 2203/047* (2013.01); *B65G 2811/095* (2013.01)

(58) Field of Classification Search
  CPC .. H03K 2217/0036; H03K 2217/94042; B66B 1/302; G06F 1/32; G01R 31/318575; G05B 2219/34306
  See application file for complete search history.

(56) References Cited

U.S. PATENT DOCUMENTS

| | | | |
|---|---|---|---|
| 4,348,618 A * | 9/1982 | Nakamura | B60L 15/005 318/135 |
| 4,499,986 A * | 2/1985 | Tsuboi | H02P 25/18 198/810.01 |
| 5,285,029 A | 2/1994 | Araki | |
| 5,828,195 A * | 10/1998 | Zalesski | H02K 11/215 318/273 |
| 6,334,522 B2 | 1/2002 | Haruta et al. | |
| 8,396,588 B2 | 3/2013 | Senger et al. | |
| 9,150,116 B2 * | 10/2015 | Matscheko | B60L 13/03 |
| 10,478,933 B2 * | 11/2019 | Duan | B23Q 11/0092 |
| 11,762,390 B1 * | 9/2023 | Alagic | G06F 18/211 701/23 |
| 2007/0048103 A1 * | 3/2007 | Williams | B60P 7/083 410/100 |
| 2017/0211640 A1 * | 7/2017 | Pearce | H02P 29/04 |
| 2017/0260007 A1 | 9/2017 | Zoeller et al. | |
| 2019/0386588 A1 * | 12/2019 | Weber | H02K 41/02 |
| 2023/0283220 A1 * | 9/2023 | Feng | H02P 3/14 318/811 |

FOREIGN PATENT DOCUMENTS

| | | | | |
|---|---|---|---|---|
| EP | 3726230 | A1 * | 10/2020 | |
| WO | 8101833 | A1 | 7/1981 | |
| WO | 2004025818 | A1 | 3/2004 | |
| WO | WO-2017127720 | A1 * | 7/2017 | ........... F16D 63/002 |

OTHER PUBLICATIONS

Extended European Search Report, European Patent Office, corresponding Europe Application No. 19891178.6, dated Jul. 25, 2022.

European Office Action, European Patent Office, corresponding Europe Application No. 19891178.6, dated May 16, 2024.

\* cited by examiner

SYSTEM AND METHOD FOR ELECTRIC MOTOR CONTROL IN A MANUFACTURING ENVIRONMENT

RELATED APPLICATIONS

This application claims priority to U.S. Provisional Application No. 62/773,631 filed Nov. 30, 2018, which is hereby incorporated herein by reference.

FIELD

The present disclosure relates generally to a system and method for electric motor control in a manufacturing environment and, more particularly, a system and method for safety control of linear and rotary servo motors in a manufacturing environment.

BACKGROUND

In a manufacturing environment, there are typically many machines operating to move, manipulate, process or otherwise deal with raw materials and parts. These machines are generally driven by various electric motors that may include linear or rotary servo motors. Examples of machines that make use of electric motors include conveyor systems and robotic systems. These machines can typically conduct operations at forces, speeds or accelerations that may pose a safety risk to humans (operators, inspectors and the like) or objects that may be in or move into the vicinity of the machines. As such, machines that pose a safety risk are generally protected by guard fencing or the like and various types of safety measures such as "dead-man" switches, interlocks, or the like that cause the machine to stop when a human may be at risk.

As one example, linear motor conveyor systems have become more popular. These conveyors include a moving element that is controlled to move along a track by electromotive force. In some cases, the moving element includes a permanent magnet and the track includes an electromagnetic field generator. The moving element is placed on the track such that the magnets are acted on by the electromagnetic field in order to move the moving element along the track.

In linear motor conveyor systems, forces on the moving element can be high in order to move the moving element quickly (both acceleration and speed) in order to increase production speeds. Due to the fast acceleration and speed of travel of the moving elements, there are traditionally substantial safe guards put in place to protect nearby humans and objects. Generally, these systems are fully enclosed and include access openings that may be required to be latched or locked during production. As the moving element operates at high speeds, accessing the conveyor system, for example in order to provide maintenance or repairs, conventional systems requires the conveyor to be stopped in order to reduce the likelihood of an operator being injured by a moving element, or other moving part. As such, in conventional systems, it can be difficult to complete repairs or maintenance without significant down time for the conveyor system. In a similar way, robots or other machines operating at high accelerations and high speeds may also require control, for example safety control, that will require the machine to stop when human operators are present.

Because of this need to stop the system, it can be difficult to address even smaller issues, for example maintenance for a small area of a linear conveyor system, when the operator is required to shut down a significant area or the whole conveyor system in order to provide a safe working environment. As such, there is a need for a system and method for control of electric motors that overcomes at least one problem with conventional systems.

It is therefore desirable to provide a system and method for control of linear and rotary servo motors with the ability to control the speed and force of moving elements, in some cases, in a specific area, to ensure the electric motors are operating below hazardous levels.

SUMMARY

According to one aspect herein, there is provided a control system for an electric motor in a manufacturing environment, the control system including: a safety relay; and a power reduction circuit, wherein, when the safety relay is triggered, the power reduction circuit automatically limits the power supplied to the electric motor from a main power source such that the electric motor operates in a predetermined safe mode.

Generally speaking, the power reduction circuit includes a reduced power supply and a means of dropping the power supplied to the electric motor quickly to the level of the reduced power supply.

In some cases, the power reduction circuit may include: at least one low power source provided between the main power source and a motor coil of the electric motor; and at least one diode provided between a power source and a motor coil of the electric motor. In some cases, the at least one diode may include at least one Zener diode.

In some cases, the power reduction circuit may include: at least one low power source provided between the main power source and a motor coil of the electric motor; a switch for shorting a circuit between a power source and a motor coil of the electric motor; and a voltage monitor for monitoring a voltage provided to the motor coil to determine when shorting can be removed.

In some cases, the predetermined safe mode may include a predetermined safe force that provides for acceleration below 0.5 G. When the electric motor is a rotary motor, the predetermined safe force may be related to the angular acceleration of the motor or an end effector.

According to another aspect herein, there is provided a control system for a linear motor conveyor system with at least one moving element, the control system including: a safety relay; and a power reduction circuit, wherein, when the safety relay is triggered, the power reduction circuit automatically limits the power supplied by the linear motor to the at least one moving element such that the at least one moving element operates in a predetermined safe mode.

In some cases, the power reduction circuit may include at least one diode provided between a voltage source and a motor coil. In some cases, the at least one diode may include at least one Zener diode. In some cases, the at least one diode may include a plurality of Zener diodes for redundancy.

In some cases, the predetermined safe mode may include a safe speed between approximately 100 millimeters per second and 250 millimeters per second.

In some cases, the power reduction circuit automatically limits the power supplied to a range from approximately 0.5 Volts to 2 Volts.

In some cases, the safety relay is triggered by one or more of the following: when a malfunction is detected, when system maintenance is scheduled, or when a door or entry way to the linear motor conveyor system is opened.

In some cases, the predetermined safe mode may include a predetermined safe force that provides for acceleration below 0.5 G.

According to another aspect herein, there is provided a method for controlling an electric motor in a manufacturing system, the electric motor having a main power supply, the method including: monitoring the manufacturing system associated with the electric motor for a change in condition; on detecting a change in condition: limiting a power supplied to the electric motor, via a power reduction circuit, such that the electric motor operates in a predetermined safe mode.

In some cases, the predetermined safe mode for a linear motor may include a predetermined safe speed of between approximately 100 millimeters per second and 250 millimeters per second and a predetermined safe force that provides for acceleration below 0.5 G.

In some cases, the limiting a power supplied to the electric motor may include: switching to a low power source provided between the main power source and a motor coil of the electric motor; shorting a circuit between a power source and a motor coil of the electric motor; and monitoring a voltage provided to the motor coil to determine when shorting can be removed.

In some cases, the limiting a power supplied to the electric motor may further include, prior to shorting, cutting off the power from the main power supply to the motor coils.

In some cases, the power reduction circuit may include at least one diode provided between a voltage source and a motor coil of the linear motor.

According to another aspect herein, there is provided a method for controlling a linear motor conveyor system, the method including: monitoring the linear motor conveyor system for a change in condition; on detecting a change in condition: limiting a power supplied to the linear motor, via a power reduction circuit, such that the linear motor conveyor system operates in a predetermined safe mode.

In some cases, the predetermined safe mode may include a predetermined safe speed for the at least one moving element of between approximately 100 millimeters per second and 250 millimeters per second.

In some cases, the power reduction circuit may automatically limit the power supplied to a range from approximately 0.5 Volts to 2 Volts.

In some cases, the detecting a change in condition may include: detecting one or more of the following: a malfunction, an unscheduled maintenance requirement, a scheduled maintenance requirement, a door opened, and an entry way opened.

In an aspect, there is provided a control system for an electric motor of a linear motor conveyor system having a moving element and a power supply, the control system including: a safety relay between the power supply and the electric motor; and a power reduction circuit configured to be engaged between the power supply and the electric motor when the safety relay is triggered, wherein the power reduction circuit automatically limits the maximum power that can be supplied to the electric motor while still allowing the moving element to move on the linear motor conveyor system.

In some cases, the power reduction circuit may include at least one diode provided between the power supply and the electric motor. The at least one diode may include at least one Zener diode.

In some cases, the power reduction circuit may include a switch or transistor for shorting a connection between the power supply and the electric motor (or motor coils) and a voltage monitor for monitoring a voltage supplied to the electric motor to maintain the supply at a reduced level.

In another aspect, there is provided, a control system for an electric motor having a power supply, the control system including: a safety relay between the power supply and the electric motor; and a power reduction circuit configured to be engaged between the power supply and the electric motor when the safety relay is triggered, wherein the power reduction circuit comprises at least one diode to automatically limit the maximum power supplied to the electric motor while still allowing the motor to move and provide a predetermined safe force.

In another aspect, the present disclosure provides a control system for a linear motor conveyor system including at least one moving element, a safety relay, and a power reduction circuit wherein, when the safety relay is triggered, the power reduction circuit automatically limits the force supplied to the moving element while still allowing the moving element to move at a safe speed. In a particular case, the power reduction circuit includes at least one diode provided between a voltage source and the motor coil supply voltage. Other aspects and features of the present disclosure will become apparent to those ordinarily skilled in the art upon review of the following description of specific embodiments in conjunction with the accompanying figures.

BRIEF DESCRIPTIONS OF FIGURES

Embodiments of the present disclosure will now be described, by way of example only, with reference to the attached Figures.

DETAILED DESCRIPTIONS

Generally, the present disclosure relates to a system and method for control of electric motors in a manufacturing environment. Embodiments herein are intended to allow control of electric motors such that the electric motors move with reduced force and speed and allow for an environment where the electric motors may still operate but that will also be safe for humans to be in proximity (sometimes called a "collaborative area"). Some safety organizations have indicated that achieving collaborative functional safety is a combination of safe low force and safe low speed. The actual requirements will vary depending on the application but these are generally the variables that are considered.

In some cases, the system and method for control may be applied to a linear motor conveyor system. In some cases, embodiments of the system and method enable the conveyor system, i.e. the electric motors therein, to operate at reduced forces via a reduced voltage supply when a safety relay is triggered or otherwise desired, typically for safety reasons. By controlling the linear motor conveyor system with reduced force/voltage, it is intended that the moving elements may continue to travel on the linear motor conveyor system, but with reduced force and/or momentum (associated with a reduced acceleration and/or speed) to ensure that a human in the vicinity, or other nearby objects, will not be injured. In some cases, the reduced forces/voltage supply may be obtained/limited by shorting a power circuit to the electric motor or by including at least one diode, for example, a Zener diode, in the circuit providing power to the electric motors, which will reduce or prevent the risk of overvoltage jumps in general and, more specifically, if safety relays are not enabled.

The control system/safety relay can be considered enabled once the safety relay has switched the high voltage power supply onto an electric motor bus. The control system/safety relay may be considered triggered once the safety relay has switched out the high voltage supply and switched to a low voltage supply. In some embodiments, the at least one diode is also active once the safety relay is triggered. The control system/safety relay may be considered shut down when neither the high voltage nor low voltage power supplies are connected. Again, in some embodiments, the at least one diode may still be connected on shut down as a failsafe.

Figure 1:
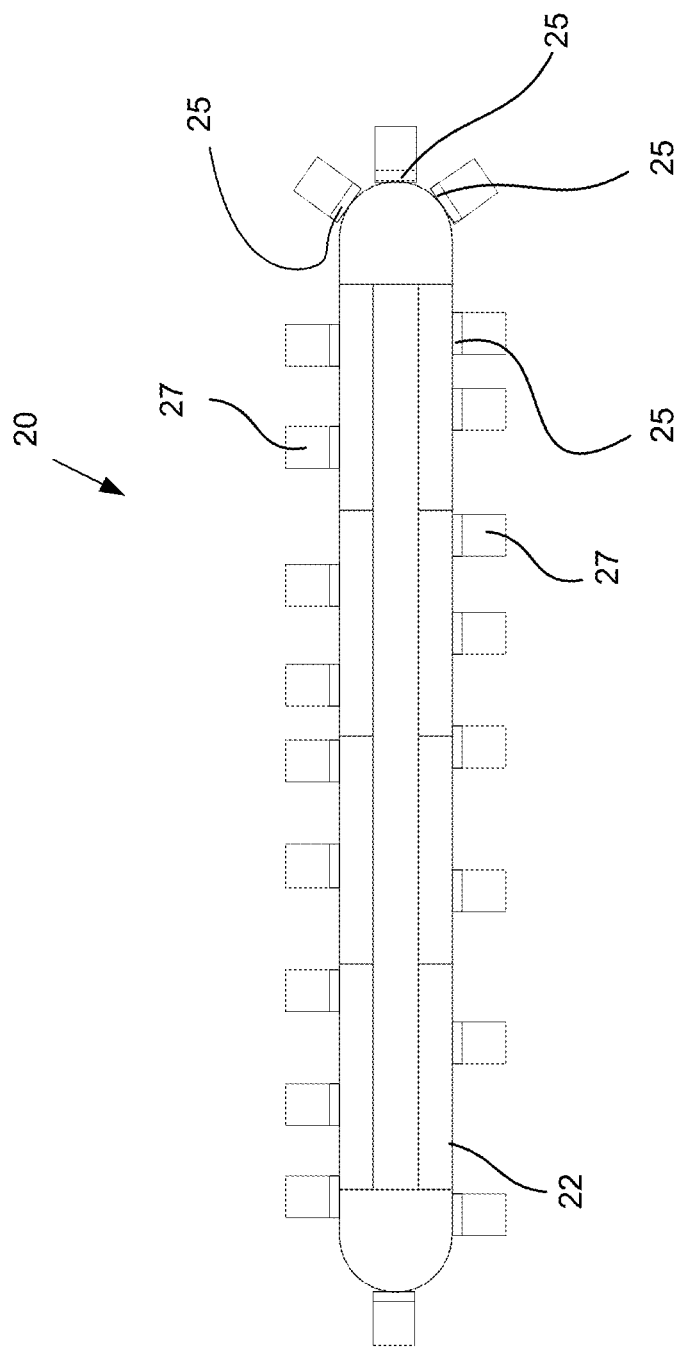
FIG. 1 illustrates a linear motor conveyor system representing an environment for a system for control according to an embodiment.

FIG. 1 shows a general schematic diagram of a linear motor conveyor system 20, with which embodiments of the system and method herein may be used. Although the primary example used herein relates to a linear motor conveyor system, it will be understood that embodiments of the control system and method described herein may be used on a variety of electric motors, including linear and rotary servo motors as further described below.

As shown in FIG. 1, the example linear motor conveyor system 20 includes a track 22 and a plurality of moving elements 25 distributed on the track 22. The track includes a plurality of motor coils (not shown in FIG. 1), which interact with at least one magnet (not shown) provided to the moving elements 25 to drive the moving element 25 along the track 22. The motor coils are effectively an electric motor for driving the moving elements 25.

The moving elements 25 are intended to travel between workstations (not shown), which may be placed at various locations along the track 22. Further, the moving elements 25 may support a pallet 27 or product (not shown), or a product on a pallet 27, that is to be operated on automatically by, for example, a robot (not shown), while moving or at a workstation. Through the operation of the linear motor conveyor, various operations can be performed to provide for the creation or assembly of a product. While the moving element 25 may carry a product/part directly, the moving element 25 may also include or be attached to a pallet or an additional tooling plate which includes, for example one or more nests, to hold the part or product. In some cases, the moving element and pallet/tooling plate may be fixed together. In this disclosure, the terms "moving element" and "pallet" may sometimes be used interchangeably, depending on the context.

It will be understood that, for more efficient manufacturing, the conveyor system is intended to allow the moving elements to be moved from workstation to workstation at a high speed and/or acceleration, and related significant momentum and/or force. As such, safety concerns may require that the linear motor conveyor system be operated in an enclosed space in order to avoid contact with human operators. In this case, the conveyor system may be accessed via various doors or entryways that can be locked when the conveyor system is in motion. Conventional conveyor systems often include safety relays or other safety mechanisms that may trigger due to various situations. For example, if a door of the enclosure is opened, the conveyor system will stop to ensure that an operator is not injured by moving parts of the system. Once the system has stopped, the operator can access the mechanical devices, electrical devices, wiring, pneumatics, hydraulics and the like, in order to repair or provide maintenance to the conveyor system or access a part being handled by the conveyor system. Unfortunately, typically either the complete conveyor system is stopped, or an enclosed location where the maintenance or service is occurring is not usable. As such, production efficiency can be reduced. Further, once the conveyor system restarts, either the particular location or the complete system, each moving element generally needs to be reset and/or located by the conveyor system and then slowly accelerated to reach operational speed. Locating and reinitiating the conveyor system can further increase downtime for production and reduce efficiency.

Conventional high force and/or momentum (acceleration and/or speed) systems such as linear motor conveyor systems, linear actuators, robots and the like tend to either be operating at full speed or stopped. Whenever a human is present, the systems generally need to be stopped or very closely controlled for safety reasons. While there have been some attempts to accommodate the use of both manual (i.e. human) stations in addition to high speed automated processing by implementing software or mechanical methods to control the force/speed of the machines, these control systems tend to be very complex and thus increase expense and possibilities for error.

Similar issues occur when a high force machine is being constructed. For example, when building a linear motor conveyor, it is important to have easy access by humans while testing the system, sometimes prior to building an enclosure or implementing other appropriate safety systems. With conventional linear motor conveyors, the need to have safety control implemented in advance can increase the time to build a conveyor system, may require employees to have further specific training for the system, or may delay testing until the system is fully built, which may make problems and/or repairs more difficult to find and complete.

Embodiments of the control system and method herein are intended to allow for more flexibility both in electric motor/conveyor system configuration and during construction/testing of electric motor enabled manufacturing systems. In embodiments herein, there may be manufacturing systems including one or a combination of high speed/acceleration sections (i.e. high momentum/force), which may be guarded/enclosed, collaborative sections (i.e. more open sections in which humans may have at least some access) and, in some cases, even guard-less sections (i.e. open areas) and the like.

Embodiments of the system and method described herein are intended to provide for manufacturing systems with electric motors wherein force/momentum (i.e. acceleration/speed) are limited to below hazardous levels/safety limits while still allowing the electric motor to operate in a low force/momentum mode. In particular, embodiments herein involve conveyor tracks or track sections, wherein pallet or moving element force/momentum (i.e. acceleration/speed) are limited to below hazardous levels/safety limits, but generally allow the moving elements to continue to travel on the conveyor system. As the conveyor system maintains control of the moving elements, even at a reduced speed, the linear motor conveyor system does not require a further initialization after the service or maintenance has been completed. Embodiments herein also allow for transitioning from a high force track section onto a safety controlled (lower force) track section and vice versa.

Figure 2:
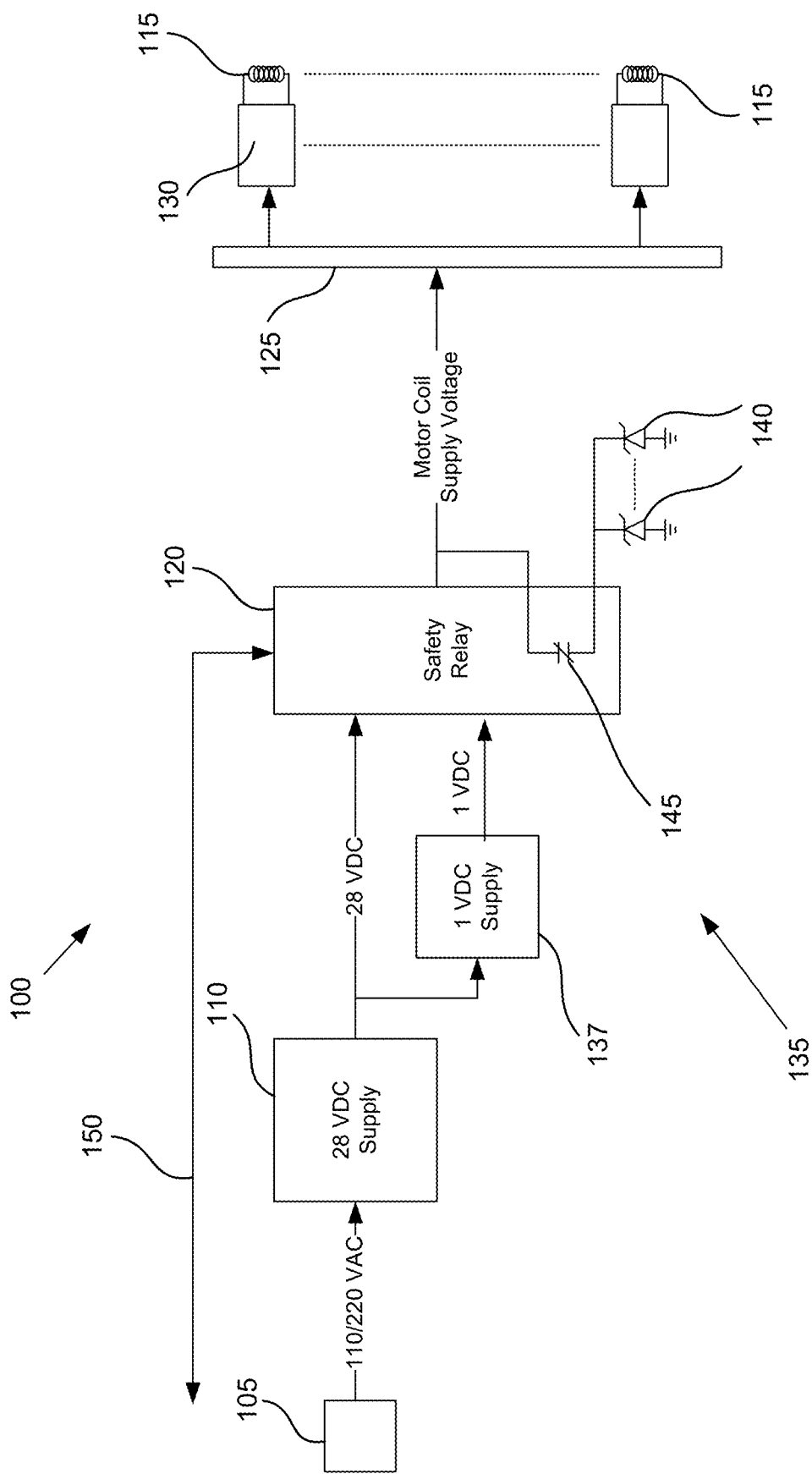
FIG. 2 illustrates an electrical schematic of a control system for controlling an electric motor according to an embodiment.

FIG. 2 illustrates an electrical schematic for an embodiment of a system 100 for control of an electric motor. In this embodiment, the electric motor is a linear motor conveyor system. The linear motor conveyor includes one or more track sections (not specifically shown other than by components therein). The track or track sections are powered by, for example, a 110/220 AC voltage supply 105 that supplies a main voltage supply 110 (in this case a 28V DC voltage supply). The main voltage supply 110 is intended to provide power to the motor coils 115 in the track of the linear motor conveyor system. The power will generally be directed through at least one safety relay 120 and an internal motor power bus 125 or the like prior to being directed to the motor coils 115 via, for example, an H-bridge circuit 130 or the like. The safety relay 120 is intended to operate whenever there is a safety issue related to the conveyor system, for example, the safety relay 120 may be triggered by a door being opened, an operator switching a control, an alarm/sensor being triggered, based on a predetermined schedule, or the like.

In this embodiment, the control system 100 further includes a power reduction circuit 135 operating with the main power supply 110 and the safety relay 120. In particular, the power reduction circuit 135 includes a low power supply 137 (in this case, a 1 V DC voltage supply) in parallel with the main power supply 110, which is also connected to the safety relay 120 and will be engaged if the safety relay 120 has been triggered. The power reduction circuit 135 also includes at least one diode 140 (in this case, a Zener diode) connected via a switch 145 between the motor bus 125 and ground. The diode 140 is intended to ground any overvoltage that may occur in the circuit once the safety relay 120 has been triggered. When the safety relay 120 is triggered, the high power supply 110 is switched out of the circuit and the low power supply 137 is switched in. At the same timing, the at least one diode 140 is switched into the circuit via the switch 145. The safety relay 120 is intended to keep the at least one diode switched in by default until the safety relay 120 is reset. In some cases, a plurality of diodes 140 (again, for example, Zener diodes), for example 2, 3, 5, 10 or numbers in between or above, may be included to provide for redundancy in the system.

In some embodiments, the safety relay 120 may be controlled by a triggering interface 150 with respect to the voltage selection. It will be understood that the system 100 may be configured such that the safety relay 120 is triggered by various changes in status of the linear motor conveyor system. Generally speaking, the safety relay 120 is triggered to place a region/area (or all) of a manufacturing system into a mode such that injury to personnel is prevented. For example, in some cases, the triggering interface may be a guard circuit interface, in which the change in status might be the opening of a guard gate preventing access to the linear motor conveyor system. Other changes in status may include, for example, the pressing of an alert button, scheduled maintenance, identification of a defective product, or the like. Other examples of where the safety relay may be triggered include: 1) Can switch an area between operators doing manual assembly over to high speed automation and back to manual operations easily 2) Can be an area that operates high speed when no people are present and automatically goes down to low speed/low force whenever people come in close proximity to the area and back to high speed when they leave 3) Can allow moving elements to safely travel through an area that has been stopped for maintenance or other purposes so the rest of the manufacturing system/line can continue to operate 4) Allows people to safely access products travelling on the line for quality audit, manual repairs, etc. 5) For machine builders, it allows moving elements to move around the system in a safe way during system build and integration before all of the safety guarding is installed.

The safety relay 120 may be any of various types that are available on the market. The required level of safety can be achieved by appropriately configuring the triggering interface 150 and safety relay 120, for example, Category 1-4 Performance Level A-E as required per the ISO 13849 standard, to switch to the low power supply 137 and diode(s) 140 when the safety relay 120 is triggered. The triggering interface 150 and safety relay 120 are intended to follow conventional safety circuit design practices.

The low power supply 137 in FIG. 2 is intended to be a DC-to-DC converter coming off the high power supply, which may be simpler than a full switching power supply, but other configurations will be available. In this embodiment, the safety relay 120 may need to be larger than in some embodiments described herein because the current is generally higher on the DC side, which may require greater cost.

In the example of a linear motor conveyor system, a target for operating below a hazardous level without stopping entirely is believed to be a maximum speed of between about 100 mm/sec to about 250 mm/sec or at another level within this range. In a particular example, the maximum speed may be approximately 150 mm/sec. These speed values will also depend on the weight of the moving element (and materials loaded thereon) when it comes to determining the maximum safe force. In order to achieve these operating conditions, it is intended that the force applied to the moving elements is sufficiently high to overcome any inertia of the moving element, for example friction, weight of moving element/payload or the like, but low enough as to not cause injury to a human (or in some cases, to the payload) in an impact. In some cases, the speed may be further limited to a speed that allows for manual operations on a product while the product is being carried by the moving element.

In terms of safety concerns, the control system may be configured to adjust the force and/or momentum to a level to allow operators to be able to stop a pallet by putting a counter force against the movement of the pallet, for example, if a finger is placed on the pallet or if a hand is sandwiched between a moving pallet and a stationary pallet, the force and/or momentum would not be enough to cause injury. In the track sections where the control system provides for low force (sometimes referred to as low force sections or collaborative sections), for example collaborative areas for manual operations, areas where safety relays have been tripped, testing sections, and the like, the low force mode will inherently require low acceleration as the control system will control the force to be under levels which would achieve high acceleration. For example, in a specific case accelerations may be configured to be below 0.5G in low force sections while in high force sections acceleration can match the upper limits of the conveyor system or capabilities of the product on the pallet, which, in some cases, may exceed 5G.

In the example of FIG. 2, the motor coils 115 of the linear motor conveyor system may conventionally be driven from a 28V DC supply. In this case, this voltage allows for high coil currents so that high pallet force/momentum (and as a result acceleration/speed) can be attained. In a linear motor conveyor system, back electromotive force (EMF), which is generated by the pallet's motion, opposes the 28V DC supply voltage and, in some cases tested, limits the pallet's upper velocity to approximately 4 m/sec. Back EMF (a voltage opposing the motor supply voltage) is created within the coils by the movement of the magnets in the moving elements passing over the coils. The greater the velocity of the moving element, the greater the amplitude of the back EMF. A point is eventually reached where the back EMF limits coil current and thus further impacts speed of the moving element. Within the above example, a back EMF of approximately 6 volts may be generated for every meter/second of velocity, which can quickly slow the moving element when the supply voltage is reduced.

As noted above, embodiments of the control system and method may be introduced to allow for track sections where moving elements can continue to operate collaboratively with a human in the vicinity, for example when an operator is working on a part, attending to maintenance or repairs, or the like. In some embodiments, the control system is intended to reduce the power supply to the motor coil in a collaborative section to be set at a nominal amount that may still allow the moving elements to travel on the conveyor, for example, approximately 1V DC rather than 28V DC. This lower voltage is intended to reduce maximum attainable coil current and as a result reduces the maximum attainable pallet/moving element force/momentum and acceleration/speed to safe or safer levels. In addition, the maximum attainable pallet and/or moving element velocity is also reduced as the pallets' back-EMF will limit pallet speed to lower levels. In essence, when power supply is limited, the moving element force/momentum, acceleration/velocity may be inherently limited by the design to values that cannot be exceeded by any firmware or other control action.

In many cases, the maximum force/momentum and acceleration/speed provided by an electric motor are directly proportional to the motor supply voltage. For example, in a particular linear motor conveyor, at 28V DC the maximum velocity is about 4 m/sec so with a supply voltage of 1V DC the maximum velocity will be about (1/28)*4=0.15 m/sec or 150 mm/sec. In this example, if it is intended to have a speed of between 100 mm/sec and 250 mm/sec, the voltage range may range from approximately 0.5 V to 2 V. It will be understood that for different electric motors, which may have different coil windings, there will generally be different voltages for achieving the same speed or range of speeds. It is intended that the control system provides for safe operating speeds, and this may be achieved through different voltages on various types of electric motors, including various linear motor conveyor systems. On rotary electric motors, of the kind used in various robotic systems, such as robotic arms and the like, the safe speed may be related in angular velocity of either the electric motor or of an end effector or the like.

The control system and method may be further configured to address cases where a moving element, at high velocity, transitions from a high force section onto a collaborative or low force section. Should this occur, the back EMF generated by the speed of the pallet may cause the coil supply voltage on the collaborative section to attempt to rise above the nominal voltage level, for example, 1 V DC. In this case, the at least one diode within the collaborative section will clamp the motor coil's voltage to about 1 V DC causing the moving element to decelerate rapidly. This deceleration back down to safer speed levels will take place generally regardless of the state of the conveyor system or track section, whether powered or un-powered and is not intended to require any action by control firmware or safety logic. As such, the control system and power reduction circuit herein will generally be simpler and less costly than conventional systems.

In a specific case, if a moving element is carrying a sensitive part or a liquid where rapid deceleration could be problematic, the overall linear motor conveyor system or the control system described herein may monitor forces applied to the moving element. It would be typical for even a sensitive part or liquid to handle at least some level of deceleration. This rapid deceleration due to back EMF may not be a mode of operation where the level would harm the part or product so it would rarely (if ever) occur. If rapid deceleration on a sensitive part did occur and was critical, the system may, for example, tag the parts as rejects. It would be understood that a small number of rejected parts may still be preferred over the downtime the linear motor conveyor system may otherwise endure.

In embodiments herein, Zener diodes offer a direct means of limiting the supply voltage to some predetermined value (for example, an upper value) in order to limit the force/power transmitted to the electric motor. Other methods of controlling force/power to the electric motor may include other voltage limiting devices, such as, for example, standard silicon and Schottky diodes and transorbs and the like. As noted, the intended purpose is to safely and securely limit the supply voltage below a predetermined threshold, for example 0.5 VDC, 1 VDC, 2 VDC, some value in between or the like. In some cases, it may be necessary to include some form of voltage monitoring, however, this may require additional complexity and cost.

Embodiments of the system and method are intended to control the conveyor system to allow the conveyor system to continue operating safely when a change in condition requiring safe people are in the same vicinity. An operator may perform manual operations associated with the conveyor system, for example operations on a pallet, a moving element, a workstation or the like, while the moving elements continue to travel safely through an area of the conveyor system that is undergoing service or maintenance. Further, the moving elements may also safely travel around the system during construction and testing prior to the integration of the safety guarding and the like.

In some embodiments herein the control system/power reduction circuit is situated between the power supply and the electric motors of the linear conveyor system and does not require any adaptation to the hardware or software associated with the electric motors or tracks of the conveyor system itself. Generally, safety certification based on software and digital electronics tends to be costly and challenging. It may be difficult to prove to regulatory bodies that a system is "guaranteed" safe within the regulatory guidelines based on software (or embedded firmware) and logic within digital electronics. It may also be difficult to make future changes to safety related firmware or electronics as it may require re-certification of the whole conveyor system. Some embodiments of the control system and method described herein provide an external, hardware solution where firmware does not play any role in the safety certification. As noted, some embodiments do not add significant cost and complexity to the electric motor or conveyor system.

As noted above, in some cases, a plurality of Zener diodes may be included to provide redundancy. The greater the number of Zener diodes, the greater the reliability of the motor voltage limiting. Additional Zener diodes allow for the energy being drawn from decelerating pallets to be distributed over multiple Zener diodes thereby limiting the heat/temperature rise in the Zener diodes, again improving reliability. Providing a plurality of Zener diodes may allow for redundancy without the requirement of creating redundancies in the software and/or electronics.

Figure 3:
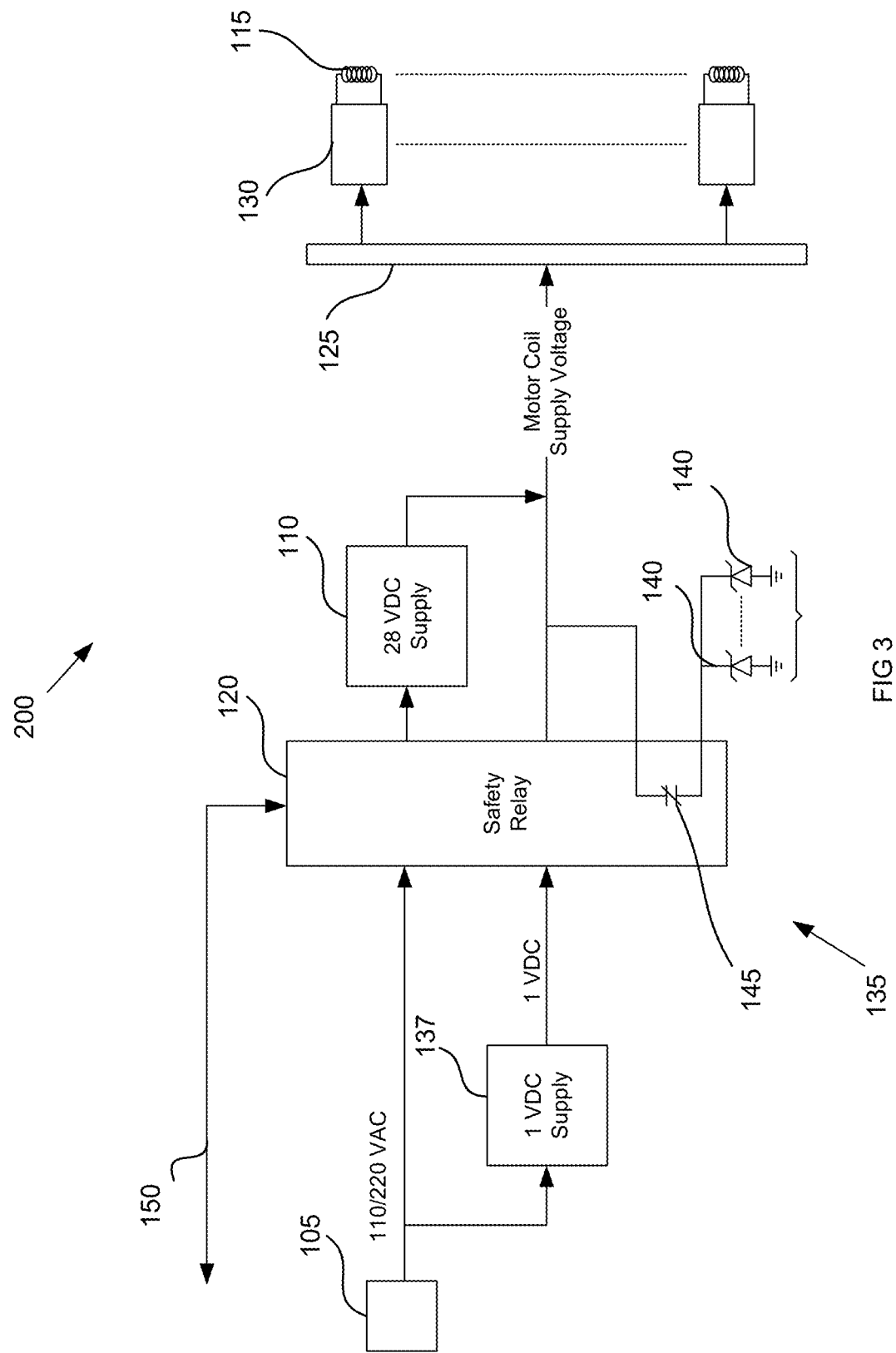
FIG. 3 illustrates an electrical schematic of a control system for controlling an electric motor according to another embodiment.

FIG. 3 illustrates an electrical schematic of another embodiment of a control system 200 for controlling an electric motor. In this embodiment, similar elements will use similar reference numbers as those in FIG. 2. In this embodiment, the safety relay 120 may be on an AC side of a voltage supply 110, for example a 28 VDC supply for the electric motor. With the safety relay 120 on the AC side, the safety relay 120 may be able to be smaller than if provided on the DC side. Power for the motor coils 115 may be routed first through the safety relay 120, then to the power supply 110 which is directed to the motor power bus 125 and then to the motor coils 115 via an H-bridge circuit 130. If the safety relay 120 are triggered, the safety relay 120 will cease allowing the power supply 110 to provide power to the motor coils 115 and the power reduction circuit will be engaged to provide a lower voltage power supply 137, for example a 1 volt DC supply, that is intended to reduce the speed and force of the moving elements on the conveyor to below safe levels. The control system 200 of FIG. 3, similarly to FIG. 2, includes at least one diode 140 (for example, a Zener diode) which redirects any voltage over the predetermined threshold to ground. This embodiment is intended to switch the AC side of the 28 VDC power supply if the higher voltage/currents on the DC are problematic. This option may include a 1V DC switching power supply (in comparison to a DC-to-DC converter as would generally be required in the embodiment of FIG. 2).

Figure 4:
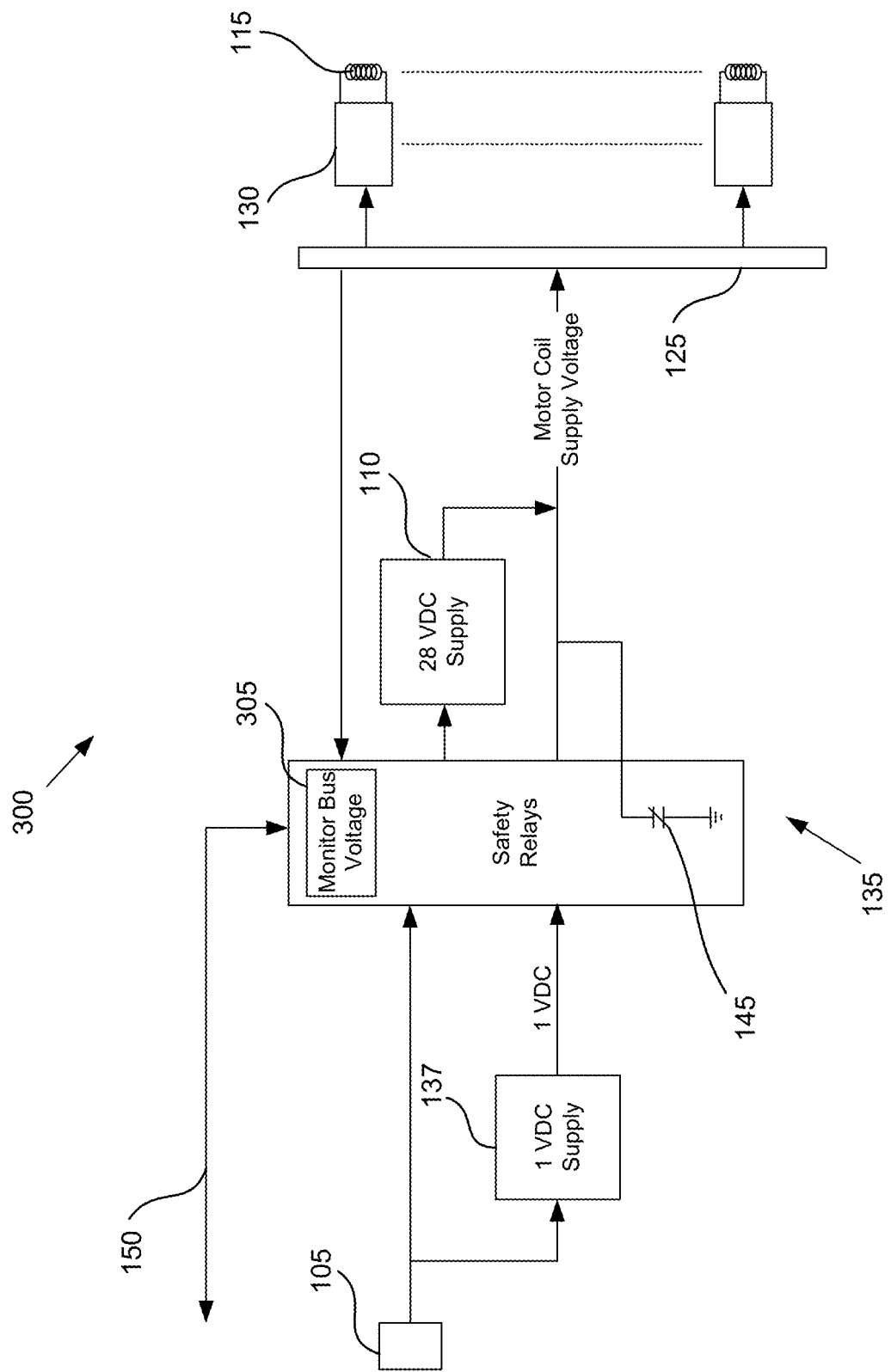
FIG. 4 illustrates an electrical schematic of a control system for controlling an electric motor according to another embodiment.

FIG. 4 illustrates an electrical schematic for another embodiment of a system 300 for control of an electric motor. In this embodiment, similar elements will use similar reference numbers as those in FIG. 2 and FIG. 3. In this case, the power reduction circuit 135 includes the switch 145 but instead of diodes, the switch is connected to ground. When the safety relay 120 is triggered and switch 145 is operated, the main power supply 110 is switched out of the circuit and the low power supply 137 is switched in. The safety relay 120 is intended to keep the switch 145 activated by default until the safety relay 120 is reset. In this case, the power from the motor bus 125 is transferred to ground (via the switch 145) to bring the motors (and thus, the moving elements) quickly to a lower speed.

In this case, the power reduction (safety) circuit 135 also includes a bus voltage monitor 305, which monitors the bus voltage and when the bus voltage drops below a predetermined threshold (in this case approximately 1 V DC), the safety circuit 135 stops shorting the bus (i.e. resets the switch 145) so the system can continue moving the moving elements with approximately 1 V DC (via the low power supply) in collaborative mode. This is different from the use of diode(s) as in other embodiments because in a shorted circuit there is a need for voltage monitoring and feedback to the switch 145 once the voltage drops to an appropriate level.

Figure 5:
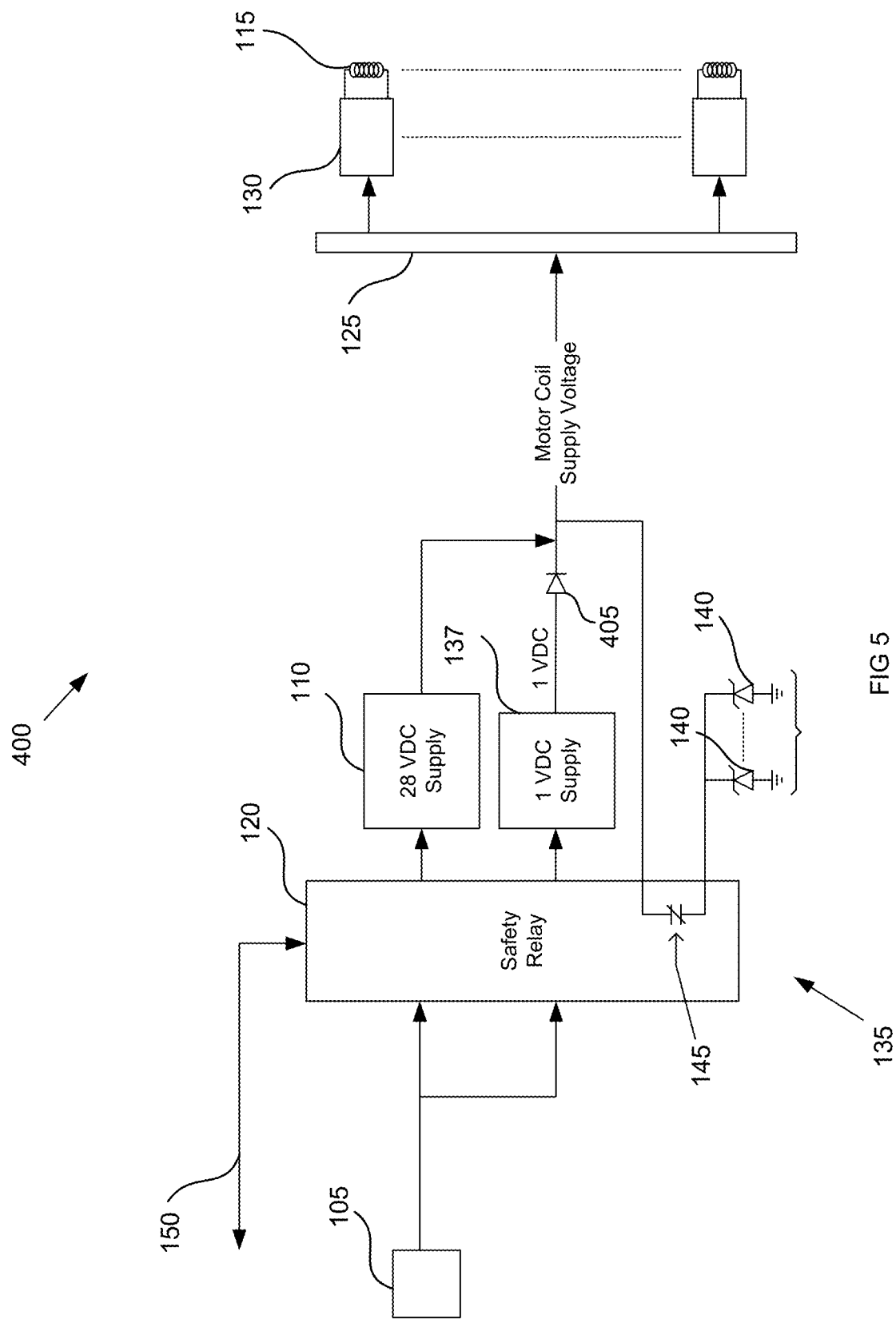
FIG. 5 illustrates an electrical schematic of a control system for controlling an electric motor according to another embodiment.

FIG. 5 illustrates an electrical schematic of another embodiment of the control system 400 that is similar to those of FIGS. 2 and 3 but in which the safety relay 120 is on the AC side of both the main power supply 110 and the low power supply 137. In this embodiment, the control system 400 includes at least one further diode 405, which may be in line with the low power supply 137 as a fail-safe after the safety relay 120 is triggered and the low voltage power supply is engaged.

Figure 6:
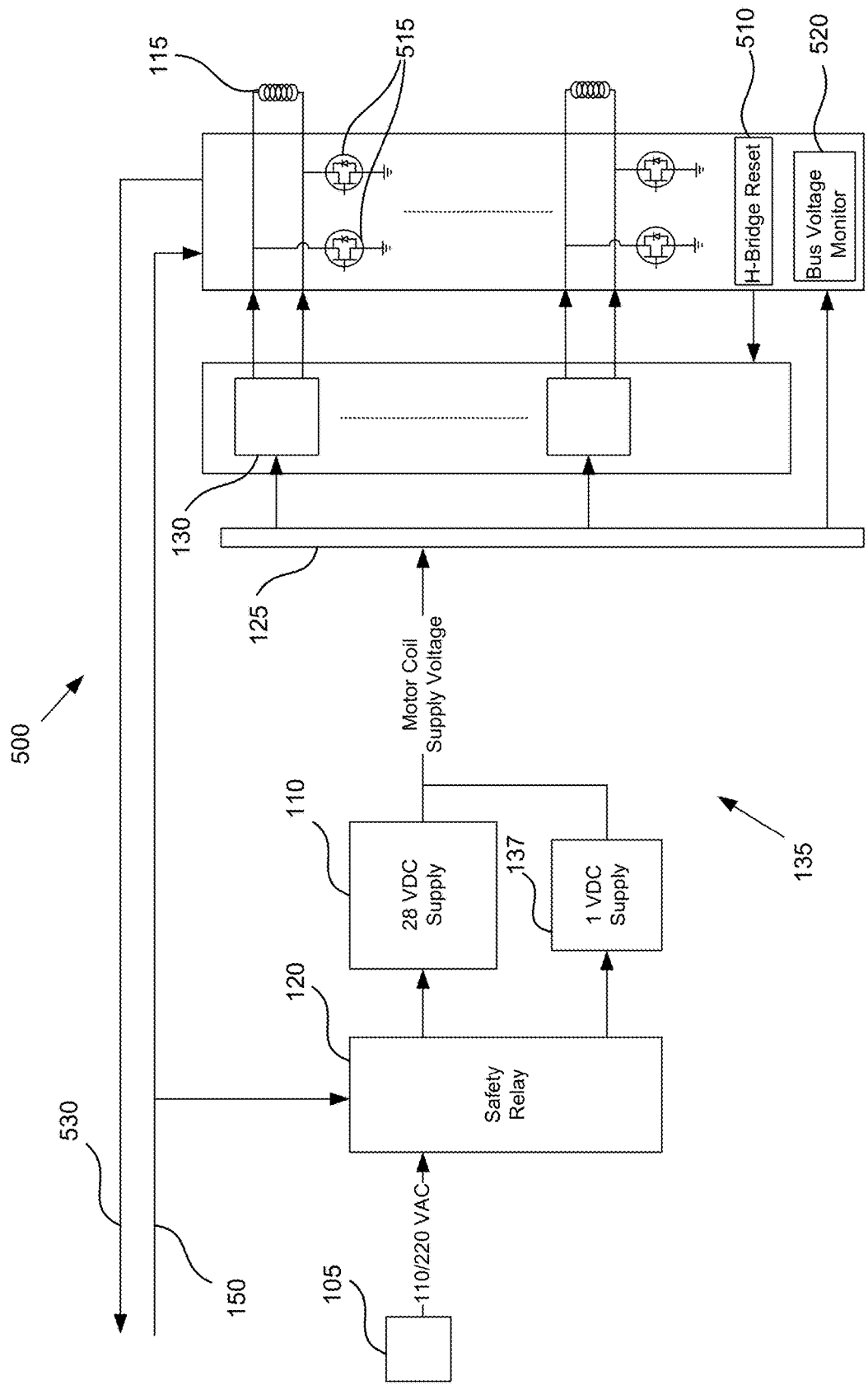
FIG. 6 illustrates an electrical schematic of a control system for controlling an electric motor according to another embodiment.

FIG. 6 illustrates an electrical schematic of another embodiment of the control system 500. The control system 500 uses some similar elements to the previous embodiments and similar reference numbers will be used. In this embodiment, the diode(s) are not used but a safety circuit board 505 is installed between the motor bus 125/H-bridge circuits 130 and the motor coils 115. When the functional safety interlock 150 trips (i.e. an external safety circuit signals the safety relay to drop out of high force/high velocity mode) the safety circuit board 505 will first signal an "H-bridge Reset" 510 to the H-bridge circuits 130 that are used for normal operation. This will force all H-bridge circuits 130 (that is, Field Effect Transitors (FET)'s within the H-bridge circuits) to open. The safety circuit board 505 will then short at least some of the motor coils 115 individually via FETs 515 or the like provided to each side of the motor coils 115. The reset of the H-Bridge circuits is done before shorting the motor coils 115 to prevent/reduce high currents that could damage components. After the safety circuit board 505 shorts the motor coils 115 to decelerate all moving elements to a low force/low velocity safe state, the safety circuit board 505 will also include a bus voltage monitor 520 to monitor the motor bus voltage. When the motor bus voltage drops below a predetermined threshold (for example, ~1 V DC), the safety circuit board 505 will stop shorting the motor coils 115 and remove the H-Bridge reset 510 such that the H-Bridge circuits 130 and motor coils 115 can operate in low power mode (i.e. at approx. 1 V DC), also called collaborative mode. In this embodiment, discharging the energy across multiple shorted coils avoids the potential problem of handling large current spikes that may occur through more centralized diodes or to a shorted bus. Further, having a plurality of shorted coils can be more effective at removing the kinetic energy and decelerating the moving elements than other embodiments. Because less energy is channeled through the short at the motor coils, there is less temperature increase when sharing the energy across shorted motor coils. In this embodiment, there may also be a feedback signal 530 to provide feedback on the operation of the safety circuit board 505, including, for example, for confirming when the safety circuit board 505 (and hence power reduction circuit 135) is verified as in working order or the like.

Figure 7:
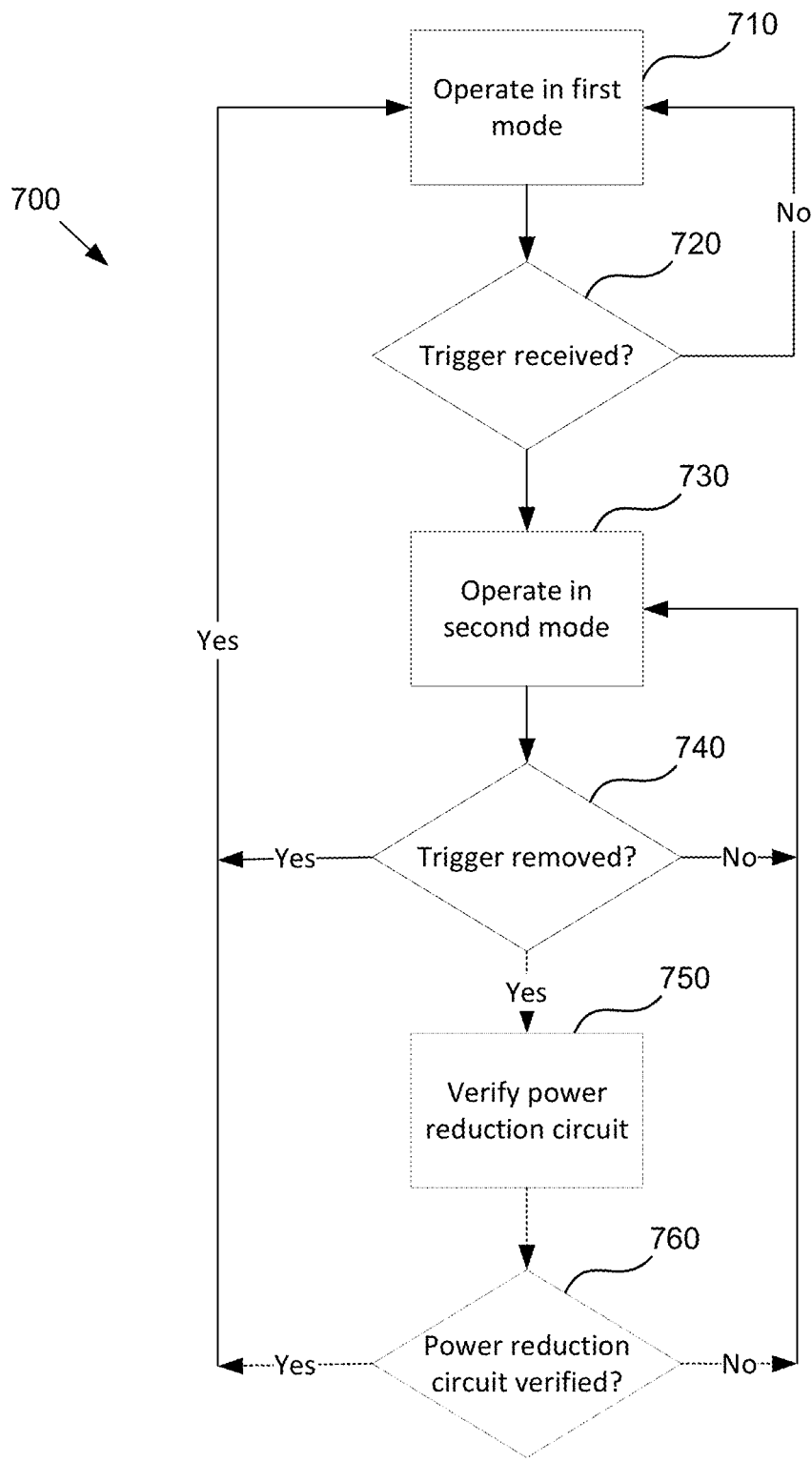
FIG. 7 illustrates a method for controlling an electric motor according to an embodiment.

FIG. 7 illustrates an embodiment of a method 700 for controlling one or more electric motors in a manufacturing environment/system. At 710, the one or more electric motors are operating in a first mode (sometimes called high power or regular mode). At 720, a control system monitors for a safety trigger, such as a door opening on an enclosure, a safety alarm, a scheduled maintenance, or the like as generally described herein. If a safety trigger is activated, at 730, the control system controls the one or more electric motors to operate in a second mode (sometimes called low power or safe mode), which involves a lower force/momentum than the first mode. At 740, the control system then monitors if the safety trigger is removed or ended. If the safety trigger is not removed, the one or more motors are maintained in the second mode. If the safety trigger is removed, the control system may either return to operating in the first mode 710 or in some cases, at 750, may verify that the safety system is reset. If reset, at 760, the control system will return to operating in the first mode. Otherwise, the control system will remain in the second mode 730. Generally speaking, there will be situations where the manufacturing system/control system will default to safe (second) mode operation unless the safety relay is reset and ready to monitor for any changes in status of the operation.

In an example using a linear motor conveyor system, the method includes monitoring for a safety issue or a change in track status or the like, for example monitoring for a safety relay to be triggered on a preconfigured section of track or the like. For example, the safety relay may be triggered when the system detects a malfunction that requires a human response for repair, when there is scheduled maintenance, when a door or entry way to the conveyors system is opened, or the like. Once the safety relay is triggered or a safety area is otherwise detected, the method includes reducing and capping the voltage being supplied to the linear motor conveyor system in at least some area of the track. In some particular cases, the system may reduce a 28 voltage supply to 1 voltage supply. Because of the reduced/capped voltage, as the moving elements enter into the safety controlled track section, the moving elements are decelerated to predetermined levels of force and speed that is unlikely to cause injury. In order to reduce and cap the voltage, in some embodiments, at least one diode (e.g. a Zener diode) has been provided in a power reduction circuit in order to clamp any motor voltage, including any voltage being generated by back EMF when the moving element enters the safety controlled track section and experiences the deceleration. In other embodiments, the voltage is shorted between the power supply and the electric motor to reduce the voltage quickly and the voltage is then monitored to cap the voltage at a low power level. On leaving the safety controlled track section, the method may switch the safety relays such that the moving element may again accelerate to a normal operating speed. In one example, once the repair, maintenance or the like is completed and the operator leaves the safety controlled track section, the linear motor conveyor system may return to full programmable control of acceleration and deceleration of the moving elements. In some cases, when the high voltage supply is active, the low voltage supply and Zener diodes are disconnected by the power reduction circuit.

Figure 8A:
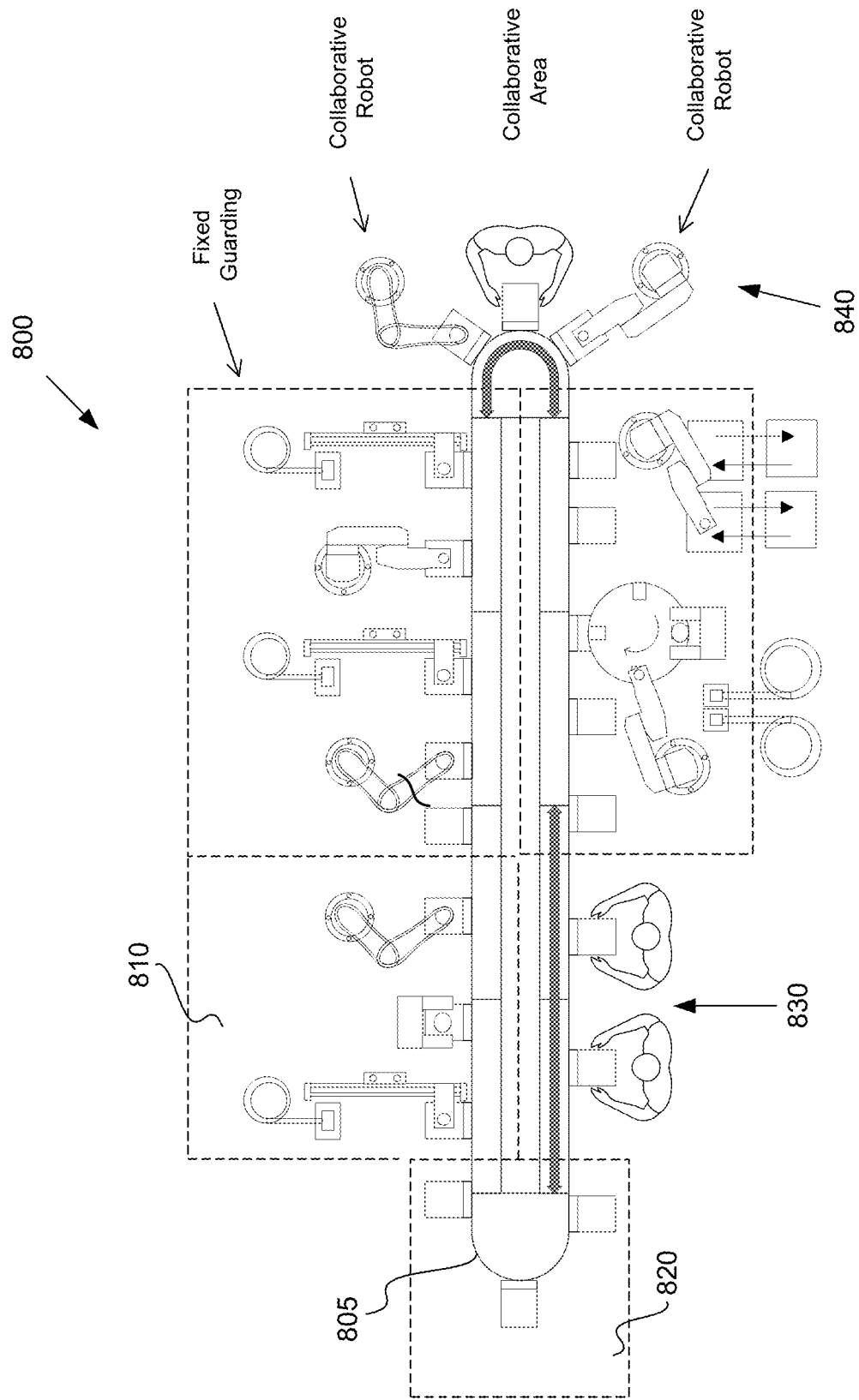
FIG. 8A illustrates a manufacturing environment/system with a combination of high speed and collaborative areas according to an embodiment.
Figure 8B:
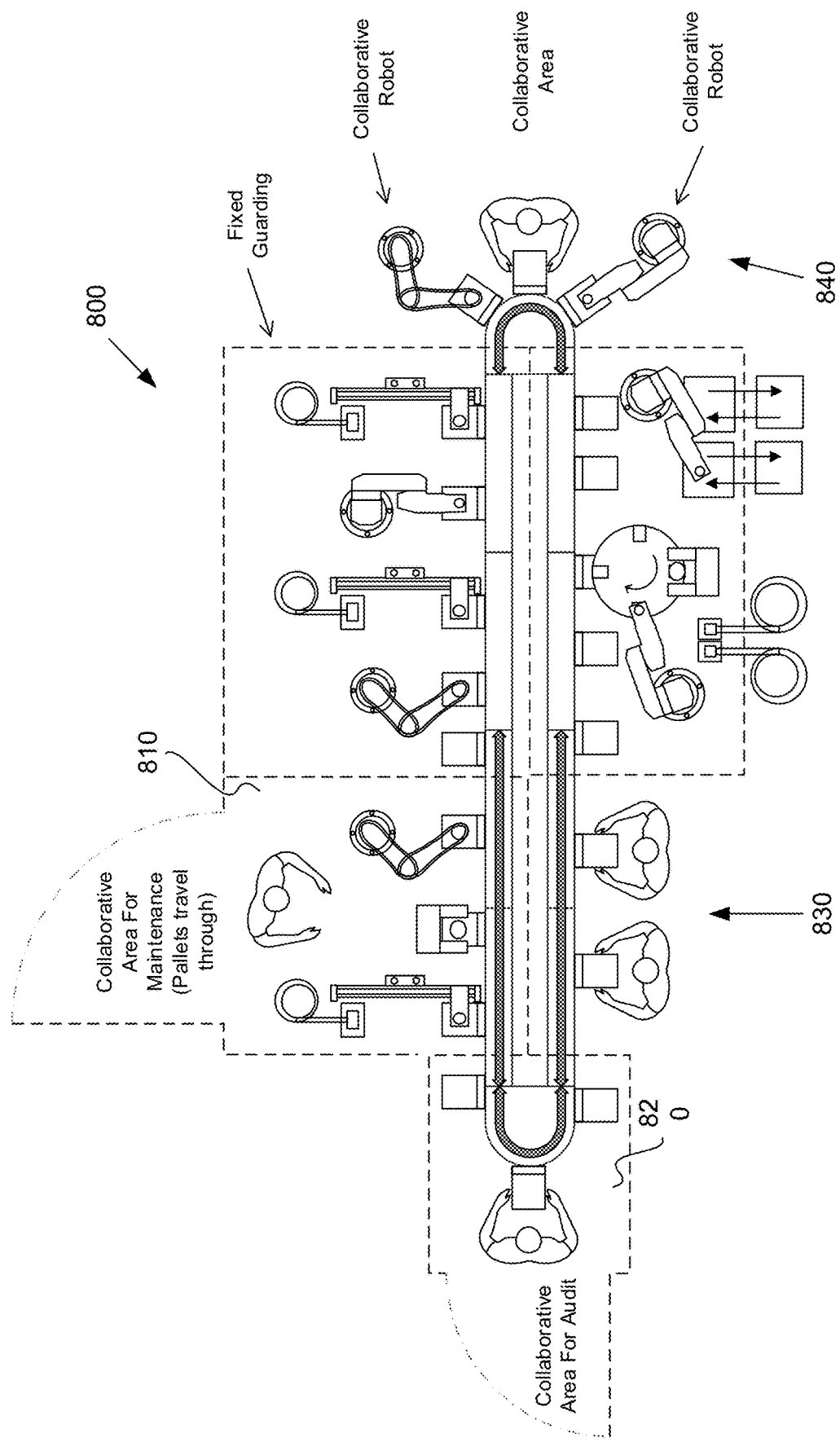
FIG. 8B illustrates the manufacturing environment/system of FIG. 8A with a different status.

FIGS. 8A and 8B illustrate a linear motor conveyor system 800 with a combination of high force and/or momentum automated areas and low force and/or momentum collaborative areas. It will be understood that, depending on the operating characteristics of the manufacturing system, there may need to be a portion of track or an area in which the moving elements need to slow down before moving into a collaborative area. This portion or area can be determined based on the maximum speed and, in the case of the linear motor conveyor, the back EMF that can be used for braking, as well as the various other factors involved in the control.

As illustrated in FIGS. 8A and 8B, in one area 810, the area may be a high speed automated area, until a setting is changed or the safety relay is triggered via, for example, an operator entering the enclosure (as illustrated in FIG. 8B) for any reason, for example, to perform maintenance or the like. In some cases, the safety relay may be triggered by, for example, opening an enclosure door or entryway, sensing via light curtains, motion sensors of various kinds, weight detecting pads, WiFi monitors or other commercially available safety detection mechanisms. Although the above discussion relates to high force and/or momentum/speed operations, the control system and method may also be useful in mid-range machines that may operate guarding-less but may still benefit from operating at reduced force and/or momentum/speed at some times. In general, it is intended that the embodiments of the system and method provide for low force collaborative areas for various types of automated systems, including linear motor conveyor systems.

In another area 820, the safety relay may be triggered when an auditor enters the enclosure to audit the system (as illustrated in FIG. 8B). Once the auditor leaves, the system may resume normal behavior. In still another area 830 or 840, it may be possible to have manual operations and have the safety relays engaged for longer periods of time in these areas. Further, in situations where a conveyor system is being built or upgraded, and may not have appropriate enclosures, the safety relay may be engaged to allow for appropriate testing and quality assurance measures prior to enclosing the system.

As illustrated, some areas may be configured as collaborative areas 830 and 840, where manual operations may be performed either alone or in conjunction with automated operations. It is intended that these collaborative areas may have the safety relay triggered for both the linear motor conveyor track section as well as other machines such as robots while manual operations are being performed. If an operator was to leave the collaborative area and the area was to continue with automated operations, the linear motor conveyor system and robots may return to a higher force/speed section in order to increase production speed.

Although the embodiments provided herein focus on linear motor conveyor systems, it will be understood that a similar control system may be introduced for other electric motors, including linear or rotary motors where it is desired to have a safety system or control of the forces involved. A control system as described herein, which allows the electric motor to continue operation, but at a lower force, may be beneficial in further machinery where various operating speeds may be desired.

In still other examples, as illustrated in FIGS. 8A and 8B (area 840), the control system and method may be incorporated with rotary servomotors such as those used in robots and the like, which may allow for an electric motor to operate at a low force mode, which may be safer in various situations and a high force or regular mode in other situations. Rotary servomotors may be employed in a variety of different machines, and may be included in for example, industrial robots which may operate alone or in conjunction with, for example, a linear motor conveyor system as shown in FIGS. 8A and 8B. In this specific example, it may be beneficial, when a safety relay is triggered, to operate both the linear motor conveyor and the nearby industrial robots in the same section at a low force safety controlled mode. It will be understood that, as rotary servomotors are employed in many different uses, the control system described herein may be beneficial in uses where a low force safety regulated mode may be desired.

Generally speaking, a manufacturing system may include various combinations of full force/speed areas and collaborative areas. For example, a manufacturing system may include: a sustained collaborative track section, such as in the case of an assembly line that includes a human/manual operation where the track always needs to be slowed down; a temporary collaborative track section where the track is only slowed down while a temporary task is accomplished, such as maintenance, audit, etc.; a random/arbitrary track section that may be temporarily operated in collaborative mode depending on which triggers were active (i.e. if a safety cage is opened in one area, it will cause the track to slow down in that particular area; which could be any arbitrary/random area/track section).

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. For example, specific details are not provided as to whether some of the embodiments described herein are implemented as a software routine running on a processor via a memory, hardware circuit, firmware, or a combination thereof.

The above-described embodiments are intended to be examples only. One of skill in the art will understand that elements of an embodiment may be substituted in other embodiments and that each embodiment may not require each and every element described. Alterations, modifications and variations can be effected to the particular embodiments by those of skill in the art without departing from the scope, which is defined solely by the claims appended hereto.

What is claimed is:

1. A control system for an electric motor having a main power source configured to drive at least one moving element on a conveyor in a manufacturing environment, the control system comprising:
    a safety relay; and
    a power reduction circuit comprising at least one low power source that is different from the main power source,
    wherein, when the safety relay is triggered, the power reduction circuit automatically switches to the low power source and reduces and limits power supplied to the electric motor to a predetermined non-zero level such that the electric motor continues to operate in a predetermined safe mode, in which the electric motor continues to drive the at least one moving element at lower power without coming to a stop, and in which it is safe for a human to be in proximity to the electric motor.

2. The control system according to claim 1, wherein the power reduction circuit comprises:
    at least one diode configured to limit the power provided to a motor coil of the electric motor.

3. The control system according to claim 1, wherein the power reduction circuit comprises:
    a switch for shorting a circuit between the main power source and the at least one low power source and a motor coil of the electric motor; and
    a voltage monitor for monitoring a voltage provided to the motor coil to determine that only the at least one low power source is operating and shorting can be removed.

4. The control system according to claim 1, wherein the predetermined safe mode comprises a predetermined safe force that provides for acceleration below 0.5 G.

5. A control system for a linear motor conveyor system with at least one linear electric motor and at least one moving element in a manufacturing environment, the control system comprising:
    a safety relay; and
    a power reduction circuit
    wherein, when the safety relay is triggered, the power reduction circuit automatically reduces and limits power supplied by the at least one linear electric motor to the at least one moving element to a predetermined non-zero level such that the at least one moving element continues to operate in a predetermined safe mode, in which the moving element continues to move on the linear motor conveyor system but at a lower non-zero speed without coming to a stop, and in which it is safe for a human to be in proximity to the at least one linear electric motor.

6. The control system according to claim 5, wherein the power reduction circuit comprises at least one diode provided between a voltage source and a motor coil.

7. The control system according to claim 6, wherein the at least one diode comprises a plurality of Zener diodes.

8. The control system according to claim 5, wherein the lower non-zero speed comprises a speed between approximately 100 millimeters per second and 250 millimeters per second.

9. The control system according to claim 5, wherein the power reduction circuit automatically limits the power supplied to a range from approximately 0.5 Volts to 2 Volts.

10. The control system according to claim 5, wherein the safety relay is triggered by one or more of the following: when a malfunction is detected, when system maintenance is scheduled, or when a door or entry way to the linear motor conveyor system is opened.

11. The control system according to claim 5, wherein the predetermined safe mode comprises a predetermined safe force that provides for acceleration below 0.5 G.

12. A method for controlling an electric motor configured to drive at least one moving element on a conveyor in a manufacturing system, the electric motor having a main power source which drives the at least one moving element in a way that would be unsafe for a human to be in proximity to the electric motor, the method comprising:
    monitoring the manufacturing system associated with the electric motor for a change in condition;
    on detecting a change in condition:
        reducing and limiting a power supplied to the electric motor, via a power reduction circuit, to a predetermined non-zero level such that the electric motor continues to operate in a predetermined safe mode, in which the electric motor continues to drive the at least one moving element at lower power without coming to a stop, and in which it is safe for the human to be in proximity to the electric motor.

13. The method according to claim 12, wherein the predetermined safe mode for a linear motor comprises a predetermined safe speed of between approximately 100 millimeters per second and 250 millimeters per second and a predetermined safe force that provides for acceleration below 0.5 G.

14. The method according to claim 12, wherein the reducing the power supplied to the electric motor comprises:
    switching to a low power source separate from the main power source and connected to a motor coil of the electric motor;
    shorting a circuit between the main power source and a motor coil of the electric motor; and
    monitoring a voltage provided to the motor coil to determine when shorting can be removed.

15. The method according to claim 14, wherein the reducing the power supplied to the electric motor further comprises, prior to shorting, cutting off the power from the main power source to the motor coil.

16. The method according to claim 12, wherein the power reduction circuit comprises at least one diode provided between the main power source and a motor coil of the linear motor.

17. A method for controlling a linear electric motor in a linear motor conveyor system in a manufacturing environment, the method comprising:
    monitoring the linear motor conveyor system for a change in condition;
    on detecting a change in condition:
        reducing power supplied to the linear electric motor, via a power reduction circuit, to a predetermined non-zero level such that the linear motor conveyor system continues to operate in a predetermined safe mode, in which the moving element continues to move on the linear motor conveyor system but at a lower non-zero speed without coming to a stop, and in which it is safe for a human to be in proximity to the linear electric motor.

18. The method according to claim 17, wherein the lower speed comprises a predetermined safe speed for the at least one moving element of the linear motor conveyor system of between approximately 100 millimeters per second and 250 millimeters per second and the power reduction circuit automatically limits the power supplied to a range from approximately 0.5 Volts to 2 Volts.

19. The method according to claim 17, wherein the detecting a change in condition comprises:
   detecting one or more of the following: a malfunction, an unscheduled maintenance requirement, a scheduled maintenance requirement, a door opened, and an entry way opened.

\* \* \* \* \*